US010553921B2

(12) United States Patent
Roos et al.

(10) Patent No.: US 10,553,921 B2
(45) Date of Patent: Feb. 4, 2020

(54) RECIPROCATING MILLIMETER WAVEGUIDE SWITCH

(71) Applicant: Roos Instruments, Inc., Santa Clara, CA (US)

(72) Inventors: Mark Roos, San Carlos, CA (US); Rick Rodriguez, Brentwood, CA (US); Ray Beers, San Jose, CA (US); James Cochran, Santa Clara, CA (US)

(73) Assignee: Roos Instruments, Inc., Santa Clara, CA (US)

( * ) Notice: Subject to any disclaimer, the term of this patent is extended or adjusted under 35 U.S.C. 154(b) by 0 days.

(21) Appl. No.: 15/953,253

(22) Filed: Apr. 13, 2018

(65) Prior Publication Data

US 2019/0319324 A1 Oct. 17, 2019

(51) Int. Cl.
| | |
|---|---|
| *H01P 1/10* | (2006.01) |
| *H01P 1/12* | (2006.01) |
| *H01P 5/16* | (2006.01) |
| *H01P 1/06* | (2006.01) |
| *G01S 7/40* | (2006.01) |

(52) U.S. Cl.
CPC ............. *H01P 1/122* (2013.01); *H01P 5/16* (2013.01); *G01S 7/40* (2013.01); *G01S 13/931* (2013.01)

(58) Field of Classification Search
CPC ............. H01P 1/10; H01P 1/122; H01P 5/16
USPC ............................................. 333/108
See application file for complete search history.

(56) References Cited

U.S. PATENT DOCUMENTS

| | | | | |
|---|---|---|---|---|
| 4,201,963 A | * | 5/1980 | Welti ...................... | H01P 1/122 333/106 |
| 5,075,649 A | * | 12/1991 | Pellegrineschi ........ | H01P 1/161 333/137 |
| 6,201,906 B1 | * | 3/2001 | Kich ........................ | H01P 1/122 333/103 |
| 6,380,822 B1 | * | 4/2002 | Lindgren ................. | H01P 1/122 333/106 |
| 9,373,452 B2 | * | 6/2016 | Warwick ................. | H01H 45/02 |
| 2014/0266498 A1 | * | 9/2014 | Tsounis .................... | H01P 1/122 333/108 |
| 2016/0172731 A1 | * | 6/2016 | Kawamura ............... | H01P 1/10 333/108 |

* cited by examiner

*Primary Examiner* — Dean O Takaoka

(57) ABSTRACT

A mechanical, M-to-N, reciprocating millimeter waveguide switch is provided, where M and N are integers. A mechanical, one-to-four, reciprocating millimeter waveguide switch is also provided, together with a method for switching millimeter waves from one input to one of four outputs is also provided.

13 Claims, 15 Drawing Sheets

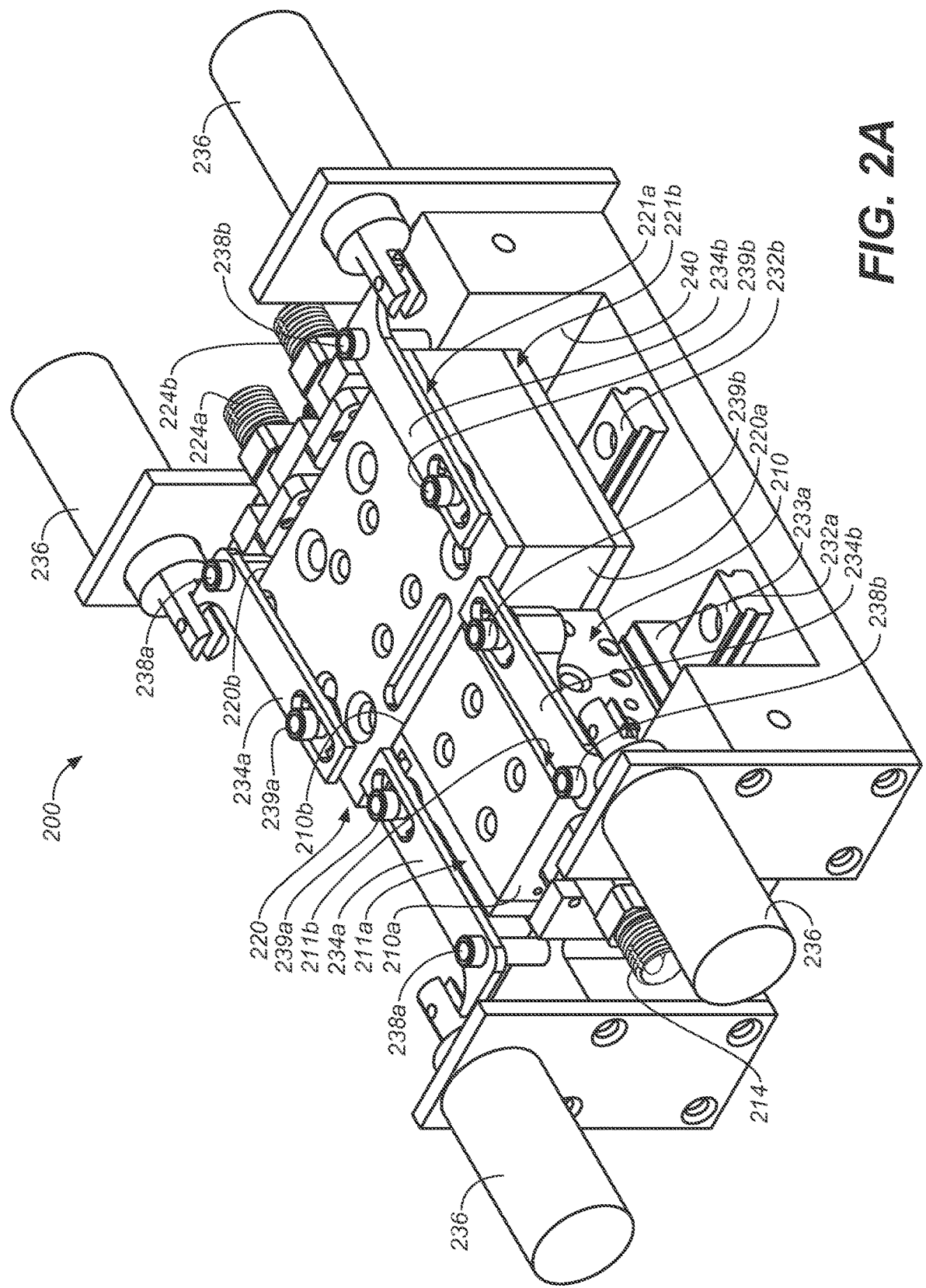

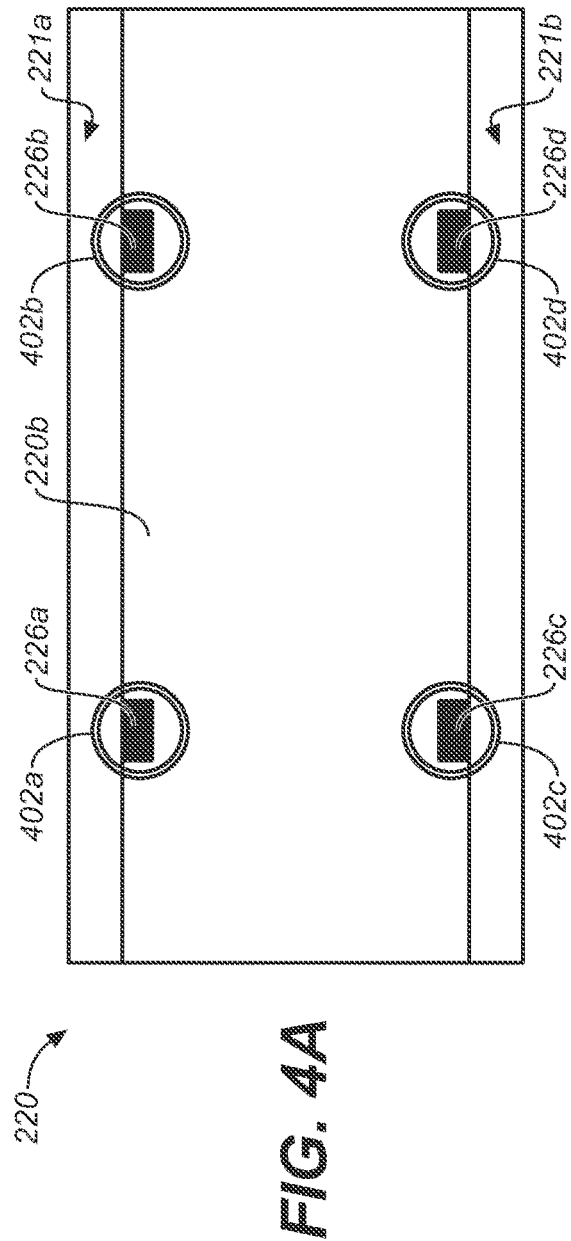
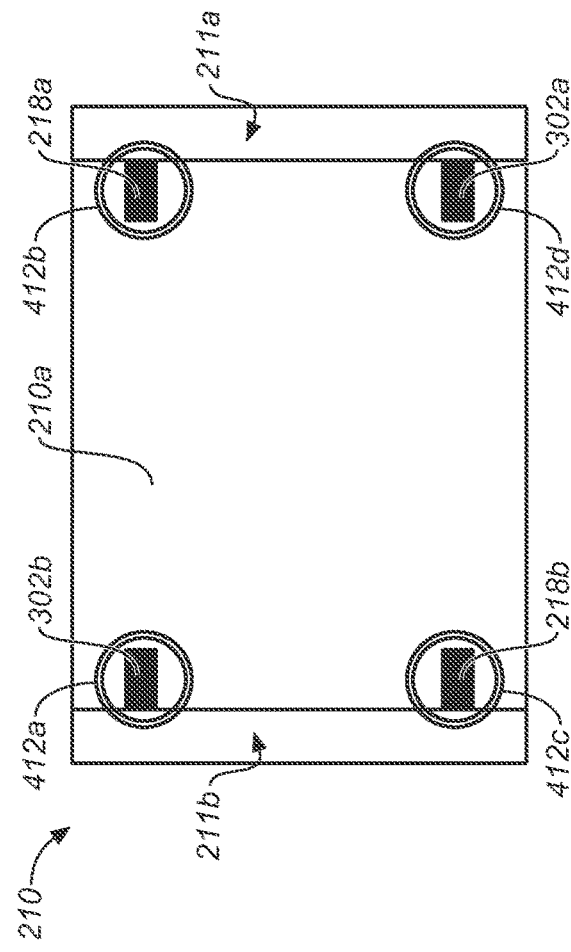
FIG. 4A
FIG. 4B

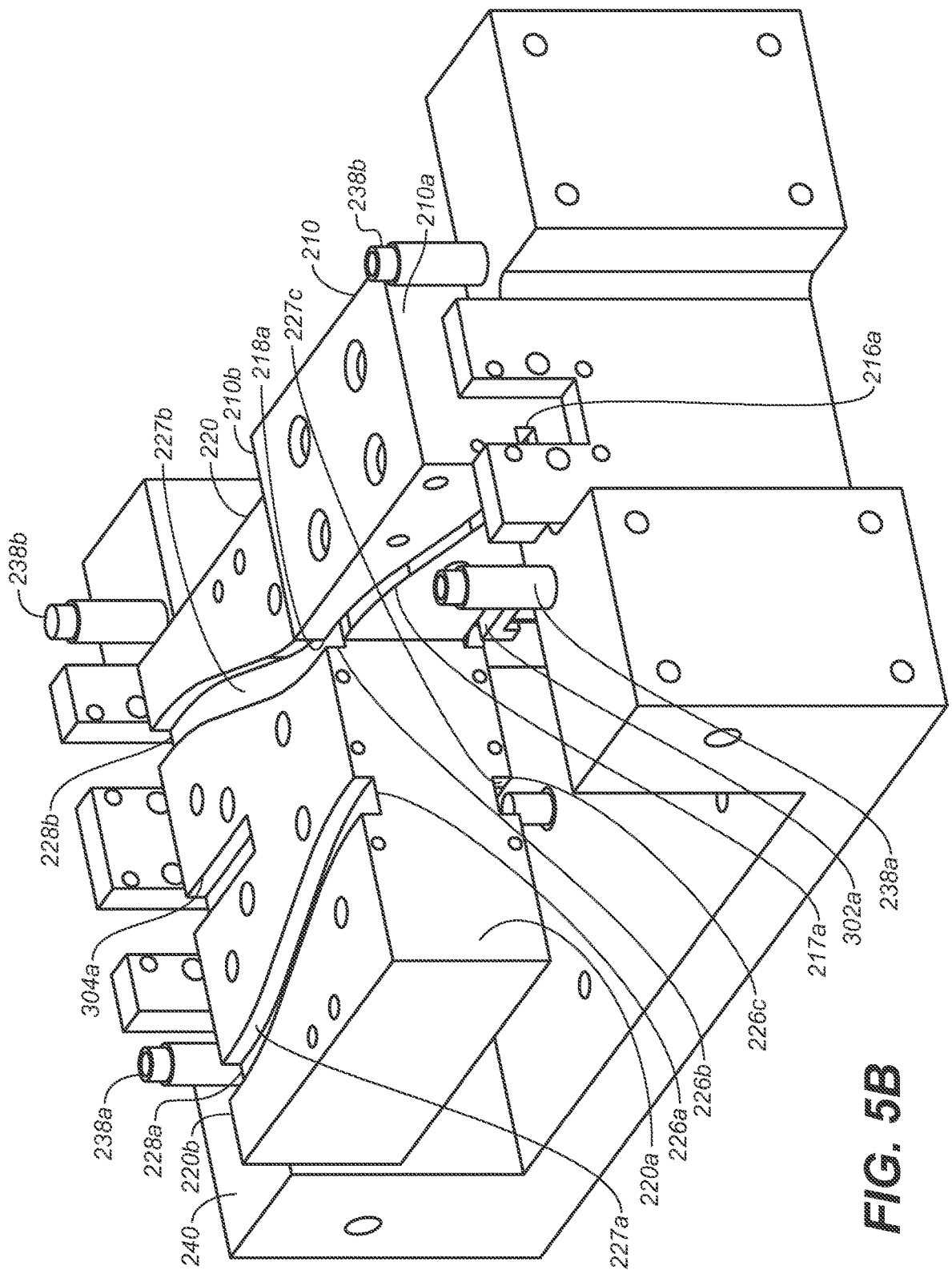

RECIPROCATING MILLIMETER WAVEGUIDE SWITCH

BACKGROUND

Automotive applications are requiring increased use of RF/microwave frequency bands, from low RF signals through millimeter-wave frequencies at 77 GigaHertz (GHz). As these high-frequency signals become more integral parts of the worldwide driving experience, effective test solutions become more critical for designers developing new automotive RF/microwave circuits, as well as production facilities seeking efficient methods for verifying the performance of these added circuits. While lower-frequency testers are in abundance, and automotive applications employ a wide range of wireless frequencies—including remote keyless entry (RKE) systems at 433 and 868 MHz—a growing concern in automotive markets is for the accurate and cost-effective testing of 77 GHz automotive radar systems. This interest stems from the fact that historically, measurement equipment at such high frequencies has neither been commonplace nor cost-effective.

A number of different automotive radar-based safety applications make use of frequencies from 76 to 77 GHz, for adaptive cruise control (ACC), blind-spot detection (BSD), emergency braking, forward collision warning (FCW), cross-traffic alert (CTA), lane change assist (LCA), and rear collision protection (RCP). For example, in a collision warning system, an automotive radar sensor can detect and track objects within the range of the transmitted and returned radar signals, automatically adjusting a vehicle's speed and distance in accordance with the detected targets. Different systems can provide a warning of a potential collision ahead and also initiate procedures leading to emergency braking as required.

BRIEF DESCRIPTION OF THE DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIG. 2A is a perspective drawing of a 1×4 reciprocating millimeter waveguide switch, according to an embodiment.

FIG. 4A depicts a plan view of an output face of the first transfer block of FIG. 3A, according to an embodiment.

FIG. 4B depicts a plan view of an input face of the second transfer block of FIG. 3C, according to an embodiment.

FIGS. 5A-5D depict the four different positions of the 1×4 reciprocating millimeter waveguide switch, used to switch a millimeter signal from one input waveguide to one of four output waveguides, according to an embodiment.

DESCRIPTION OF EMBODIMENTS

Figure 1A:
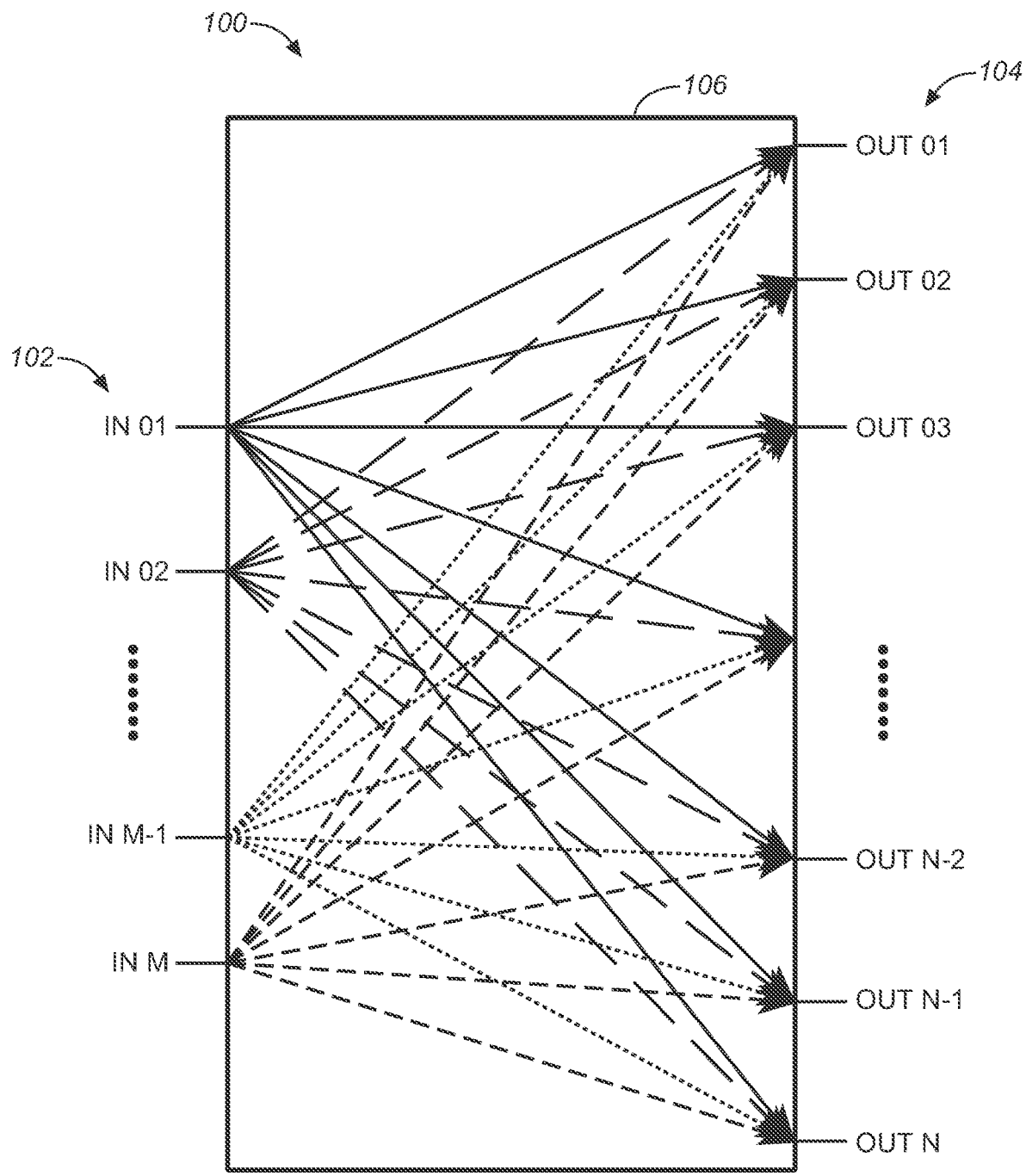
FIG. 1A is a schematic diagram of an M×N waveguide switch, according to an embodiment.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of high frequency (e.g., millimeter or micrometer) signals capable of being transmitted and received by an electronic device and/or electrical or magnetic signals capable of being stored, transferred, combined, compared, and otherwise manipulated in an electrical device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "providing," "moving," "introducing," "conveying," "receiving," "transmitting," "aligning,"

or the like, refer to the actions and processes of a switching device such as a waveguide switch.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example systems described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

As used herein, waveguide RF switches are electromagnetic switches with hollow circular or rectangular cross-sections and are used for routing RF energy in microwave communications, broadcasting, and in radar applications, for example. Waveguide RF switches can be used to transfer both power and communication signals. As used herein, the signals are in the millimeter (mm) wavelength region, typical from about 1 mm to about 10 mm.

As used herein, a reciprocating switch is a mechanical switch based on reciprocating motion (also called reciprocation). Reciprocating motion, as used herein, is a back-and-forth linear motion in the switching mechanism. In the present disclosure, the switching mechanism is the back-and-forth linear motion of two blocks relative to each other, one block being a first transfer block for conveying an input signal and the other block being a second transfer block for conveying an output signal.

As used herein, a choke flange is used in a choke connection, which may be formed by mating one choke flange and one cover flange. In some embodiments, a blind mate choke flange may be used, in which a smooth mating surface serves as the cover flange. In either case, the central region of the choke flange face is very slightly recessed so that it does not touch the face of the cover flange, but is separated from it by a narrow gap. The recessed region is bounded by a deep choke trench (or ditch or groove) cut into the face of the flange. Choke flanges are usually used with rectangular waveguides, such as used in transmitting mm waves.

It is to be noted that, as used in this specification and the appended claims, the singular forms "a," "an," and "the" include plural referents unless the context clearly dictates otherwise. Also, any reference herein to "top", "bottom", "upper", "lower", "up", "down", "front", "back", "first", "second", "left" or "right" is not intended to be a limitation herein. Herein, the term "about" when applied to a value generally means within the tolerance range of the equipment used to produce the value, or may mean plus or minus 10%, or plus or minus 5%, or plus or minus 1%, unless otherwise expressly specified. Further, the terms "substantially" and "about", as used herein, mean a majority, or almost all, or all, or an amount within a range of about 51% to about 100%. It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Overview of Discussion

In recent years, radar capability has been added to motor vehicles, such as for adaptive cruise control (ACC) and forward collision warning (FCW). The radar frequency is typically in the 60 GigaHertz (GHz) to 90 GHz range, most commonly in the 76 GHz to 77 GHz region. The corresponding range in terms of wavelength is 5.0 millimeters (mm) to 3.33 mm and the corresponding region in terms of wavelength is 3.94 mm to 3.89 mm.

Testing of chipsets for automotive use has been relatively simple with only one or two radar inputs. However, more recently, additional radar inputs have been provided to motor vehicles, such as blind spot detection (BSD), rear collision protection (RCP), lane change assist (LCA), and cross traffic alert (CTA). While some of the radar inputs cover only front or rear, and thus only need one radar detector, others, such as BSD, CTA, and LCA, require two radar detectors (one per side). It will be appreciated that such radar detection schemes can require six, or eight, or even more radar detectors.

Testing can be challenging when using more than one or two radar detectors. For six, eight, or even more radar detectors, switching may be required to switch a radar signal from one input to one of several outputs or from one of many inputs to one of several outputs. Switching from one of many inputs to one of several outputs can be called M×N switching, where M is the number of inputs, N is the number of outputs, and M and N are integers. An example of switching from one input to several outputs can be called 1×N switching. For example, where N is 4, e.g., four outputs, the switching can be called 1×4 switching. An example of reciprocating millimeter waveguide switching described herein is 1×4 switching.

Test equipment for testing various parts of the radar systems in an automobile often has limited room and it is not uncommon to switch a millimeter signal from one input to one of two (or more) outputs. Switching from one input to two inputs may be represented as a 1×2 switch. Switches with even larger outputs may be provided, such as a 1×4 switch or a 1×8 switch.

Millimeter wave switches are currently rotary 1×2 switches. Increasing the number of inputs and outputs is commonly achieved by stacking a plurality of such rotary 1×2 switches. However, 1×2 switches are rather large, and stacking a plurality of them increases the size requirement in test apparatus.

FIG. 1A is an example schematic diagram of M×N switching. An M×N switch 100 comprises M inputs 102, N outputs 104, and a switching mechanism 106. The switching mechanism 106 may involve some sort of mechanical movement of an input relative to an output to align a desired input and a desired output. Other switching mechanisms 106 may involve optical or electronic or magnetic or other mechanism. Since the switching mechanism 106 employed herein is based on mechanical movement, the following disclosure focuses on mechanical movement.

Figure 1B:
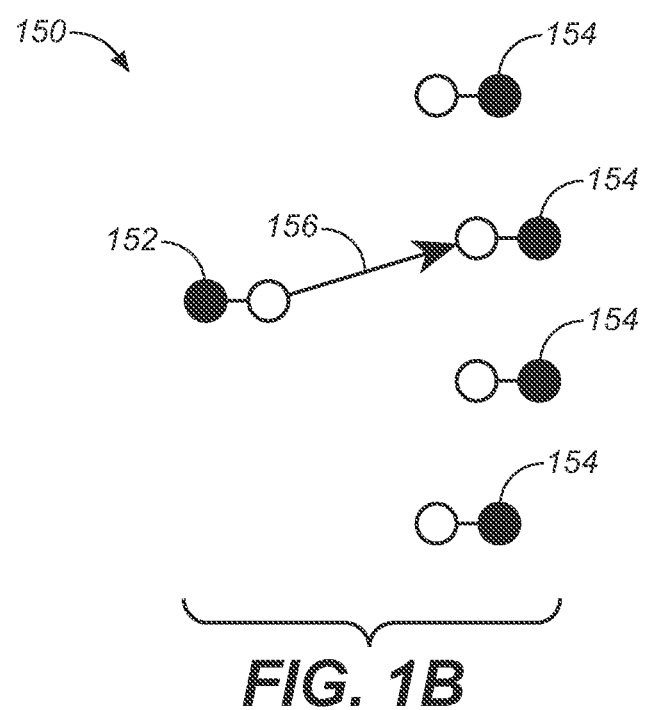
FIG. 1B is a schematic diagram of a 1×4 waveguide switch, according to an embodiment.

FIG. 1B is an example schematic diagram of 1×4 switching. A 1×4 switch 150 comprises one input 152, four outputs 154, and a switching mechanism 156. Switching mechanism 156 may be similar to switching mechanism 106. In this instance, a rotary switching mechanism 156 is shown. However, while a reciprocating, linear motion switching mechanism is disclosed herein, the final result is the same—switching an input 152 to one of four outputs 154.

In accordance with principles disclosed herein, a mechanical, M-to-N reciprocating millimeter waveguide switch, where M and N are integers, is provided for switching millimeter signals. In various embodiments, M and N can be different (M>N or M<N) or the same (M=N). In FIGS. 1A-1B, M is less than N.

The switching is mechanical, with the inputs moving in a linear fashion relative to the outputs. The switch operates for switching millimeter waves, typically in the range of about 1 mm to about 10 mm (about 300 GHz to about 30 GHz).

In some embodiments, M may be 1 and N may be greater than 1. In a specific embodiment. M is 1 and N is 4, such as shown in FIG. 1B. A mechanical, one-to-four reciprocating millimeter waveguide switch as disclosed herein comprises a first transfer block having one input connector M and a second transfer block having four output connectors N, each block being configured to be moved back-and-forth linearly relative to the other.

The first transfer block has an input face and an output face opposite the input face. The first transfer block further has two input openings on the input face connected to two input channels that terminate in corresponding output openings on the output face. The input openings are configured to receive a millimeter signal from an input waveguide through an input connector.

The second transfer block has an input face and an output face opposite the input face. The second transfer block further has four output channels that originate from input openings on the input face and are each connected to output openings on the output face. The output openings are each configured to transmit a millimeter signal to a separate output waveguide through a corresponding output connector.

The first and second transfer blocks are configured such that the output face of the first transfer block faces the input face of the second transfer block and the two faces slide back-and-forth relative to each other, without touching or rubbing, separated by a substantially constant gap. Switching occurs by matching or aligning one input channel (i.e., an output opening on the output face of the first transfer block) with one output channel (i.e., an input opening on the input face of the second transfer block). The sliding configuration is achieved by moving the first transfer block and the second transfer block relative to each other in a reciprocating linear motion.

The description below of a 1×4 reciprocating millimeter waveguide switch will be used to provide one embodiment of the teachings herein. Extending the teachings to 1×N switches and even M×N switches is then considered.

FIG. 2A is a perspective drawing of a 1×4 reciprocating millimeter waveguide switch 200, according to an embodiment. That is to say, the reciprocating waveguide switch 200 has one input waveguide M to the first transfer block and four output waveguides N from the second transfer block.

Figure 2B:
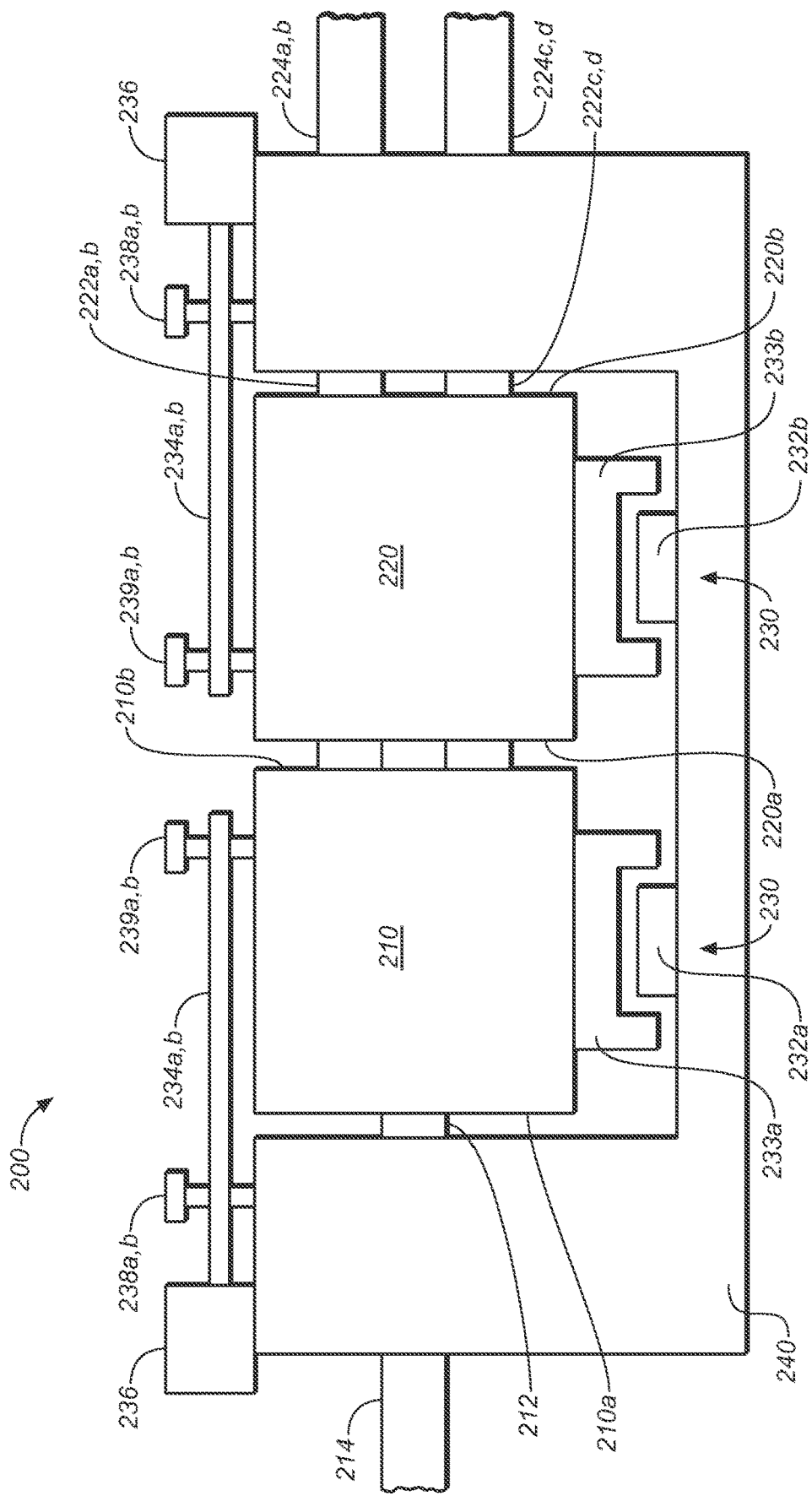
FIG. 2B is a side elevation view of the reciprocating millimeter waveguide switch of FIG. 2A, according to an embodiment.

FIG. 2B is a side elevation view of the reciprocating millimeter waveguide switch depicted in FIG. 2A. It is intended that reference be made to both FIGS. 2A-2B in the following discussion.

Two blocks, first transfer block 210 and second transfer block 220, are configured to move linearly and reciprocally relative to each other. The first transfer block 210 has an input connector 212 configured to receive millimeter waves from an input waveguide 214. The second transfer block 220 has output connectors 222a-222d configured to transmit millimeter waves to respective output waveguides 224a-224d. In FIG. 2B, output connectors 222a, 222c are behind output connectors 222b, 222d, respectively, and thus are not visible in the drawing. Likewise, output waveguides 224a, 224c are behind output waveguides 224b, 224d, respectively. It should be appreciated that, in some embodiments, reciprocating millimeter waveguide switch 200 is configured to convey signals bi-directionally such that signals are conveyed from output waveguides 224a-224d to input waveguide 214.

The first transfer block 210 further has an input face 210a and an output face 210b, with the output face 210b opposite the input face 210a. The input connector 212 is disposed on the input face 210a and is selectively associated with one of two input openings 216a, 216b (visible in, e.g., FIG. 3A). Input openings 216a and 216b on input face 210a are the openings to two input channels 217a and 217b, respectively, that terminate in corresponding output openings 218a and 218b, respectively, on output face 210b. Input openings 216a and 216b are configured to receive a millimeter signal and to convey the millimeter signal through input channels 217a and 217b, respectively.

As illustrated in FIG. 2A, transfer block 210 includes side covers 211a and 211b. In some embodiments, side covers 211a and 211b form at least one interior surface of input channels 217a and 217b, respectively. In such embodiments, for example, input channels 217a and 217b can be machined into transfer block 210 (e.g., three interior surface of the rectangular cross-section), with the fourth interior surface formed by connecting side covers 211a and 211b to transfer block 210 (e.g., via screws and screw holes). In another embodiment, input channels 217a and 217b can be machined into transfer block 210 without the use of side covers 211a and 211b.

The second transfer block 220 has an input face 220a and an output face 220b, with the output face 220b opposite the input face 220a. The output connectors 222a-222d are disposed on the output face 220b and are associated with output openings 228a-228d, respectively (visible in, e.g., FIG. 3C). The output face 210b of the first transfer block 210 and the input face 220a of the second transfer block 220 are configured to face each other and reciprocally move in non-touching contact relative to each other. Input openings 226a-226d on input face 220a are the openings to four channels 227a-d, respectively, that terminate in corresponding output openings 228a-d, respectively, on output face 220b. Input openings 226a-d are configured to receive a millimeter signal and to convey the millimeter signal through input channels 227a-d, respectively.

As illustrated in FIG. 2A, transfer block 220 includes top cover 221a and bottom cover 221b. In some embodiments, top cover 221a forms at least one interior surface of channels 227a and 227b, and bottom cover 221b forms at least one interior surface of channels 227c and 227d. In such embodiments, for example, channels 227a-227d can be machined into transfer block 220 (e.g., three interior surface of the rectangular cross-section), with the fourth interior surface formed by connecting top cover 221a and bottom cover 221b to transfer block 220 (e.g., via screws and screw holes). In another embodiment, channels 227a-227d can be machined into transfer block 220 without the use of top cover 221a and bottom cover 221b.

The blocks 210, 220 are mounted on a rail set 230, comprising a pair of parallel rails 232a, 232b. Each block 210, 220 is mounted on one of the rails 232a, 232b. In FIG. 2B, first transfer block 210 is mounted on rail 232a and second transfer block 220 is mounted on rail 232b. Each block 210, 220 is configured to be moved laterally by a pair of arms 234a, 234b, actuated by an actuator 236. As above, the arms 234a for each of the blocks 210, 220 are behind the arms 234b and thus not visible in FIG. 2B. The actuator 236 for each transfer block 210, 220 may be either a pair of uni-directional solenoids (as shown in FIG. 2A) or a single bi-directional solenoid, for example. FIG. 2A provides a view of the two transfer blocks 210, 220 mounted on the rails 232a, 232b and moveable by the pair of arms 234a, 234b, as activated by the actuators 236.

The arms 234a, 234b are rotatably secured at one end of the arms by pins 238a, 238b. The other end of the arms 234a, 234b are slotted to provide the linear motion of the two blocks 210, 220 and are slidably maintained by pins 239a, 239b in the tops of the first transfer block 210 and the second transfer block 220. As above, the pins 238b, 239b are behind the pins 238a, 239a, respectively, and thus not visible in FIG. 2B.

The transfer blocks 210, 220 each include a race or bearing 233a, 233b, respectively, secured to the respective block and configured to allow linear sliding action of the blocks on the respective rail 232a, 232b. The rails 232a, 232b are supported on a frame 240, which also supports the actuators 236, as well as the input waveguide 214 and the output waveguides 224a, 224b, 224c, 224d.

Any type of bearings 233a, 233b may be used in the practice of the embodiments, so long as the transfer blocks 210, 220 slide relative to each other. Examples of suitable bearings 233a, 233b include roller bearings, ball bearings, magnetic bearings, oil bearings, etc.

Figure 3A:
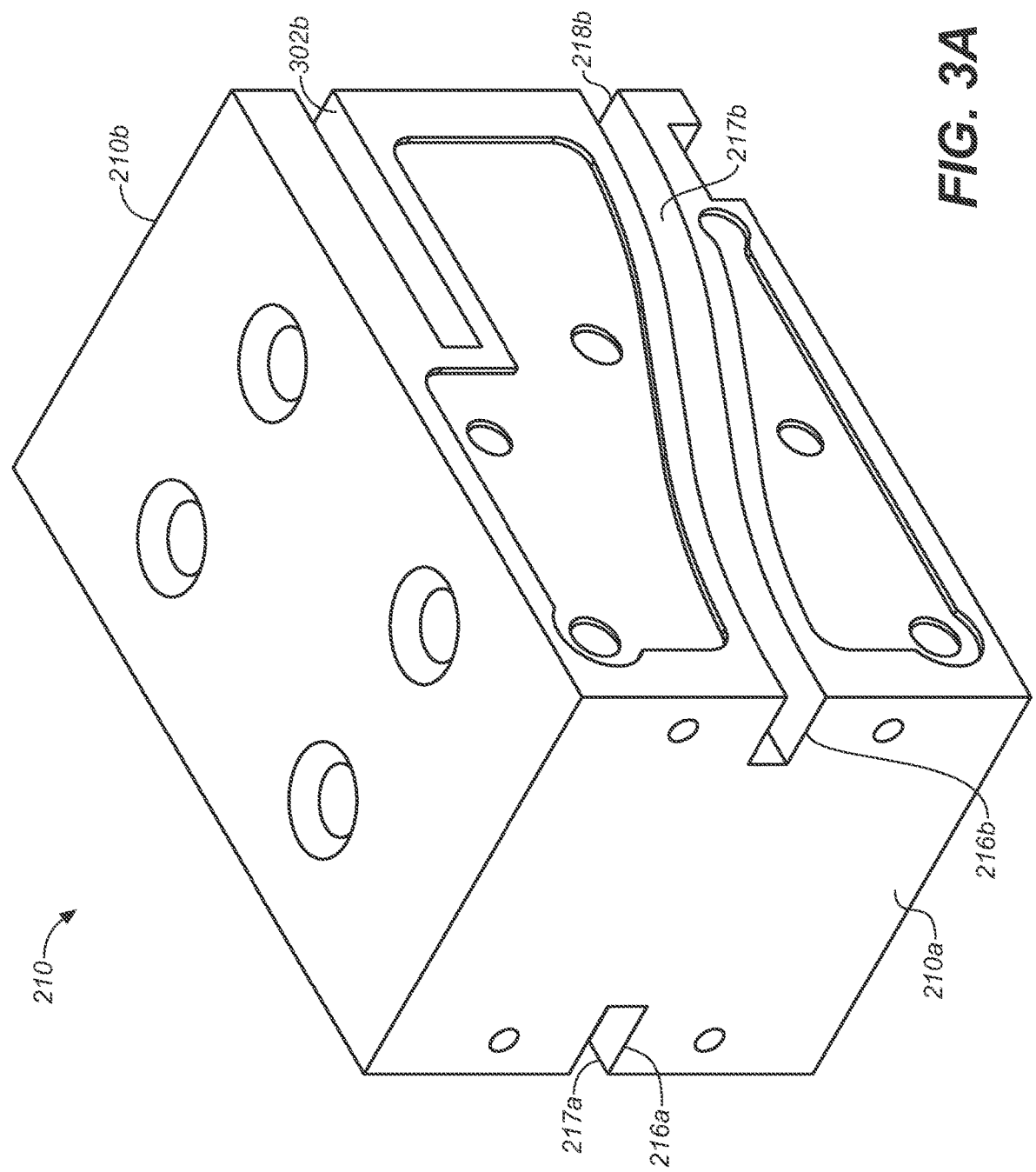
FIGS. 3A-3C depict details of a first transfer block, with FIG. 3A showing the first transfer block from the right side and FIG. 3B showing the first transfer block from the left side and with FIG. 3C depicting details of a second transfer block, both of the first transfer block and the second transfer block being used in the implementation of the reciprocating millimeter waveguide switch, according to an embodiment.
Figure 3B:
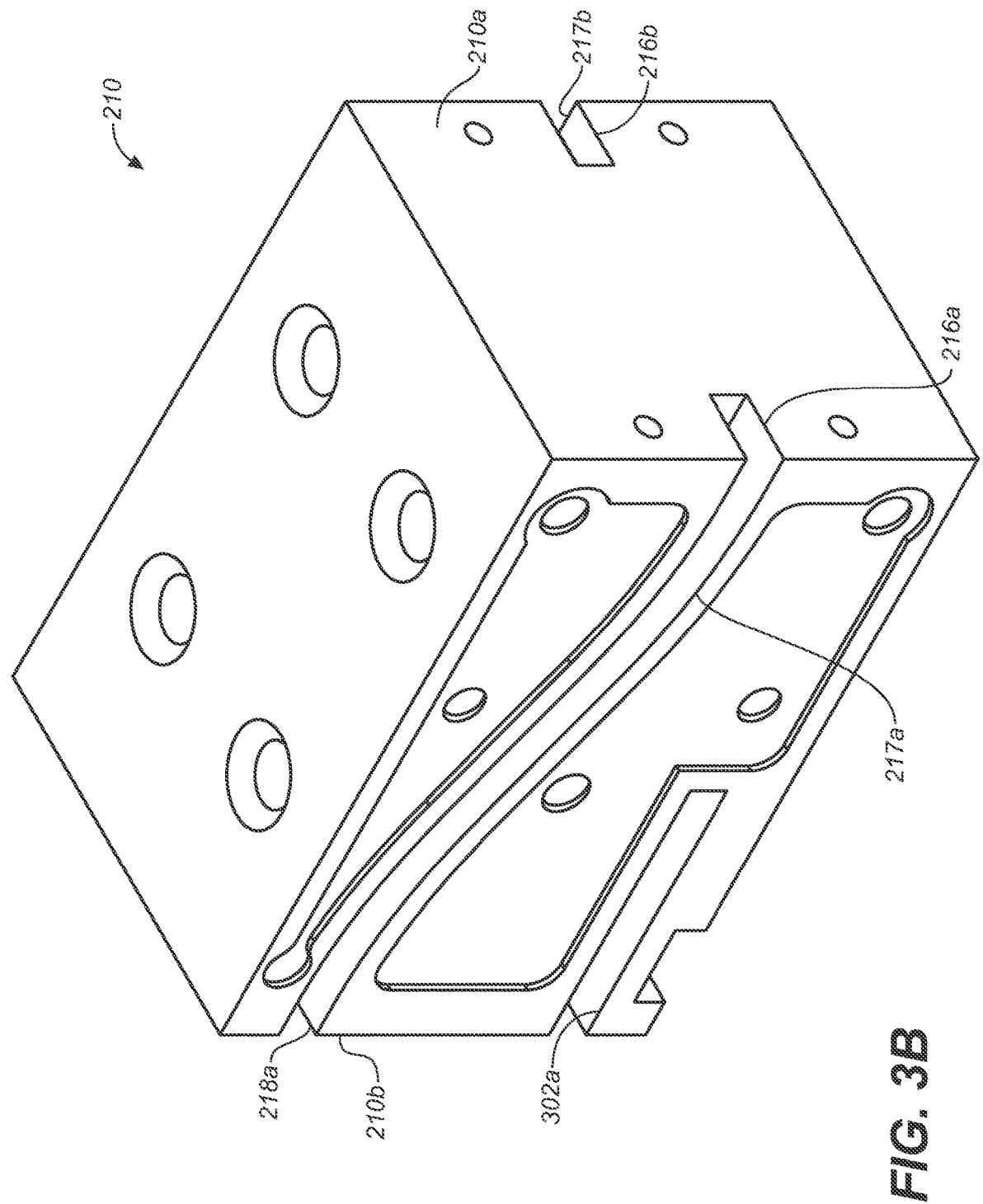
Figure 3C:
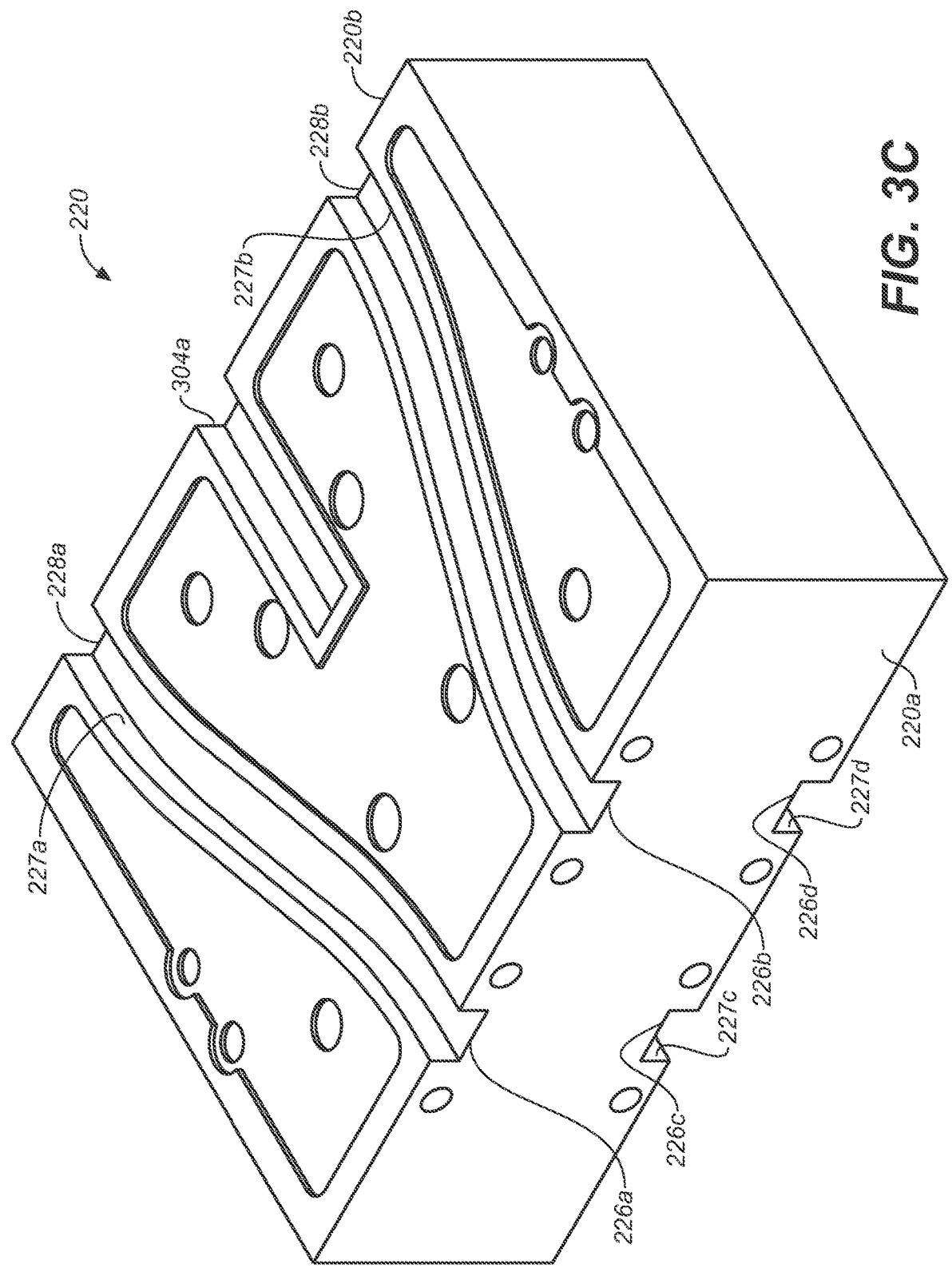

Referring now to FIGS. 3A-3C, FIGS. 3A-3B depict details of the first transfer block 210, with FIG. 3A showing the first transfer block from the right side and FIG. 3B showing the first transfer block from the left side FIG. 3C depicts details of the second transfer block 220. As illustrated in FIGS. 3A and 3B, side covers 211a and 211b are removed from transfer block 210, so as to illustrate details of input channels 217a and 217b. As illustrated in FIG. 3C, top cover 221a and bottom cover 221b are removed from transfer block 220, so as to illustrate details of input channels 227a-227d. It should be appreciated that input channels 217a and 217b of transfer block 210 and channels 227a-227d of transfer block 220 are enclosed on all sides other than the openings at completion of manufacturing and during operation.

The first transfer block 210 (FIGS. 3A-3B) passes millimeter waves from the input connector 212 (see, e.g., FIG. 2B) to one of two input openings 216a, 216b on the input face 210a, depending on the position of the first transfer block relative to the input connector 212. Each input opening 216a, 216b is connected to a respective input channel 217a, 217b. Thus, input from one waveguide 214 (M=1) is split into two input channels 217a, 217b. The two input channels 217a, 217b each terminate at a respective output opening 218a, 218b on the output face 210b of the first transfer block 210. It is to be noted that channel 217a is upwardly depending, so that output opening 218a is above input opening 216a and channel 217b is downwardly depending, so that output opening 218b is below input opening 216b. Blind slots 302a, 302b act as beam stops and absorb any stray reflected millimeter waves, acting as beam terminations that prevent reflections out of reciprocating millimeter waveguide switch 200 to unused openings.

The second transfer block 220 (FIG. 3C) passes millimeter waves from one of four input openings 226a-226d on the input face 220a of the second transfer block to one of four output openings 228a-228d on the output face 220b of the second transfer block. Each of an input opening 226a, 226b, 226c, 226d is connected to a respective output opening 228a, 228b, 228c, 228d via a respective channel 227a, 227b, 227c, 227d. Each output opening 228a-228d is respectively associated with an output connector 222a-222d, which in turn is respectively associated with a waveguide 224a-224d. Thus, output to one of four waveguides 224a-224d is provided (N=4). Switching occurs by matching one of the output openings 218a-218b on the first transfer block 210 with one of the input openings 226a-226d on the second transfer block 220 by sliding the blocks with respect to each other into the appropriate position (shown below with reference to FIGS. 5A-5D).

Specifically, either output opening 218a is aligned with one of the input openings 226a or 226b or output opening 218b is aligned with one of the input openings 226c or 226d. Blind slots 304a, 304b act as beam stops and absorb any stray reflected millimeter waves (blind slot 304b is on the underneath side, not visible in the drawing), acting as beam terminations that prevent reflections out of reciprocating millimeter waveguide switch 200 to unused openings.

Further, with regard to the first transfer block 210, the two input channels 217a, 217b in the first transfer block 210 are both connected to the input connector 212 on the input face 210a of the first transfer block, which is configured to reciprocally slide. That is, as first transfer block 210 is reciprocally moved back and forth, one or the other of the channels 217a or 217b is aligned with the input connector 212. The first input channel 217a is upwardly curved and connected to output opening 218a, while second input channel 217b is downwardly curved and connected to output opening 218b.

Additionally, the four output channels 227a-227d in the second transfer block 220 comprise two waveguide channels 227a, 227b through an upper portion of the second transfer block and separated from each other and two waveguide channels 227c, 227d through a lower portion of the second transfer block and separated from each other. The upper waveguide channels 227a, 227b each connect one of the input openings 226a, 226b, respectively, with one of the output openings 228a, 228b, respectively. The lower waveguide channels 227c, 227d each connect one of the input openings 226c, 226d respectively, with one of the output openings 228c, 228d, respectively. The first transfer block 210 and second transfer block 220 are configured such that the upwardly curved channel 217a of the first transfer block can align through output opening 218a with either of the input openings 226a, 226b of the two upper channels 227a, 227b of the second transfer block in one of two positions and the downwardly curved channel 217b of the first transfer block can align through output opening 218b with either of the two lower channels 227c, 227d of the second transfer block in one of two positions. In this manner, one input can be switched to any of four outputs.

Each input opening 216a, 216b, 226a, 226b, 226c, 226d and each output opening 218a, 218b, 228a, 228b, 228c, 228d may comprise a choke flange for providing a choke connection, with one of each input opening and one of each output opening comprising either a choke flange or a cover (or gasket/cover) so as to provide an air gap upon mating of a particular input opening with a particular output opening. The choke flange has a central region of a choke flange face that is very slightly recessed so that it does not touch the face of the cover flange, but is separated from it by a narrow gap. The recessed region is bounded by a deep choke trench (or ditch or groove) cut into the face of the flange. In some embodiments, choke flanges are pressurizable, having a gasket groove encircling the choke ditch.

FIG. 4A depicts a plan view of output face 210b of first transfer block 210 of FIG. 3A, according to an embodiment. Transfer block 210 includes output openings 218a, 218b and blind slots 302a, 302b on output face 210b. In the illustrated embodiment, each output openings 218a, 218b and blind slots 302a, 302b includes a choke flange 412a-412d. It should be appreciated that choke flanges 412a-412d, in some embodiments, are machined into transfer block 210. In some embodiments, a portion of each choke flange 412a and 412c is machined into side cover 211b and a portion of each choke flange 412b and 412d is machined into side cover 211a. It should be appreciated that input openings 216a and 216b may similarly include choke flanges.

FIG. 4B depicts a plan view of input face 220a of second transfer block 220 of FIG. 3C, according to an embodiment. Second transfer block 220 includes input openings 226a-226d on input face 220a In the illustrated embodiment, each input opening 226a-226d includes a choke flange 402a-402d, respectively. It should be appreciated that choke flanges 402a-402d, in some embodiments, are machined into second transfer block 220. In some embodiments, a portion of each choke flange 402a and 402b is machined into top cover 221a and a portion of each choke flange 402c and 402d is machined into bottom cover 221b. It should be appreciated that output openings 228a-228d may similarly include choke flanges.

Figure 4C:
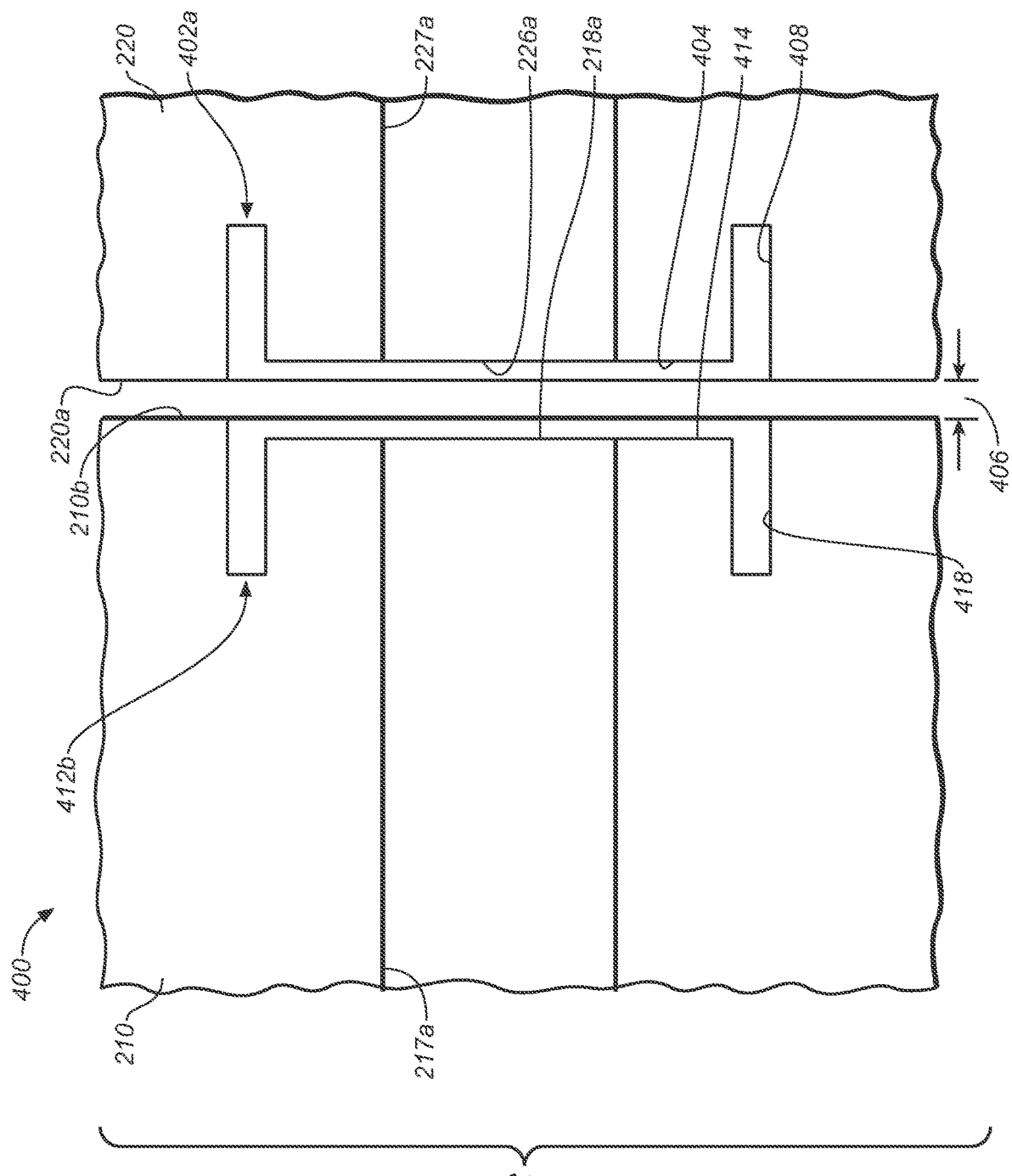
FIG. 4C depicts a cutaway view of an example position of the reciprocating millimeter waveguide switch, according to an embodiment.

FIG. 4C depicts a cutaway view of choke connection of an example position 400 of the reciprocating millimeter waveguide switch 200, according to an embodiment. In the illustrated embodiment, output opening 218a of first transfer block 210 is matched with input opening 226a of second transfer block 220. Output opening 218a includes choke flange 412b and input opening 226b includes choke flange 402a. It should be appreciated that in accordance with other embodiments, only one of output opening 218a and input opening 226b includes a choke flange.

As illustrated, waveguide channel 217a is shown communicating with waveguide channel 227a. It will be appreciated that the same view would apply if waveguide channel 217a were communicating with waveguide channel 227b or if waveguide channel 217b were communicating with one of waveguide channels 227c or 227d.

As shown in FIG. 4C, choke flange 412b includes a portion which is very slightly recessed (recessed region 414) from output face 210b. The recessed region 414 is bounded by a deep choke trench (or ditch or groove) 418 cut into the output face 210b of transfer block 210. Similarly, choke flange 402b includes a portion which is very slightly recessed (recessed region 404) from input face 220a. The recessed region 404 is bounded by a deep choke trench (or ditch or groove) 408 cut into the input face 220a of second transfer block 220. The annular, recessed grooves 408 and 418 act as a short to provide a high series impedance to millimeter waves.

When in position 400, output face 210b of first transfer block 210 and input face 220a of the second transfer block 220 are separated by a narrow gap 406. The gap 406 is exaggerated in FIG. 4C for illustration purposes, but is typically greater than 0 inch up to about 0.06 inch. During reciprocal movement of the two transfer blocks 210, 220 past each other, the gap 406 is maintained substantially constant, due to the linear movement of the two transfer blocks.

In some embodiments, choke flanges are comprised within the surfaces of transfer blocks 210 and/or transfer block 220. In some embodiments, choke flange is machined within the surfaces of transfer blocks 210 and/or transfer block 220. In other embodiments, choke flange is a separate component secured to the output face 210b of the first transfer block 210, so that it aligns with the output opening 218a (or 218b, as the case may be). Securement may be achieved by use of a suitable adhesive, brazing, welding, or the like. In some embodiments, each input opening and each output opening on the two transfer blocks 210, 220 comprises a choke flange.

The motion of the first transfer block 210 and the second transfer block 220 relative to each other to align output opening 218a on the first transfer block with one of the input openings 226a, 226b on the second transfer block or to align output opening 218b with one of the input openings 226c, 226d is depicted in FIGS. 5A-5D. Input waveguide 214 and output waveguides 224a-224d have been omitted for clarity, as have the arms 234a, 234b and actuators 236. Further, covering surfaces that complete the waveguide (i.e., provide a fourth side) are omitted so that the channels can be viewed.

Figure 5A:
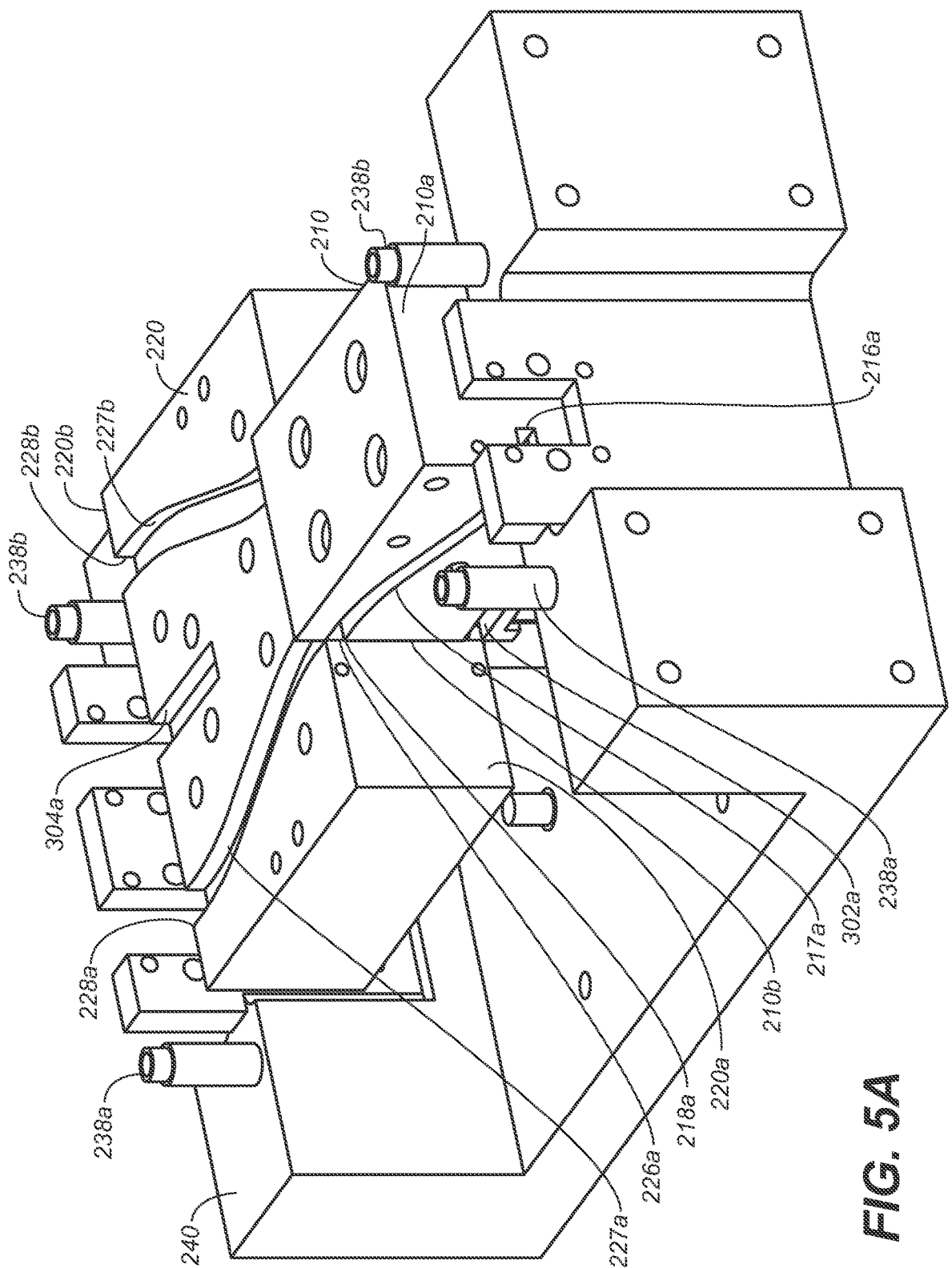

In FIG. 5A, upper channel 217a in the first transfer block 210 is aligned to upper input channel 227a in the second transfer block 220 via output opening 218a (in first transfer block 210) and input opening 226a (in second transfer block 220). The input opening 216a is aligned with the input waveguide (not shown in the Figure).

In FIG. 5B, upper channel 217a in the first transfer block 210 is aligned to upper input channel 227b in the second transfer block 220 via output opening 218a (in first transfer block 210) and input opening 226b (in second transfer block 220). In FIG. 5B, first transfer block 210 has remained stationary, while second transfer block 220 has moved laterally and linearly (to the left in the Figure) to align output opening 218a and input opening 226b.

Figure 5C:
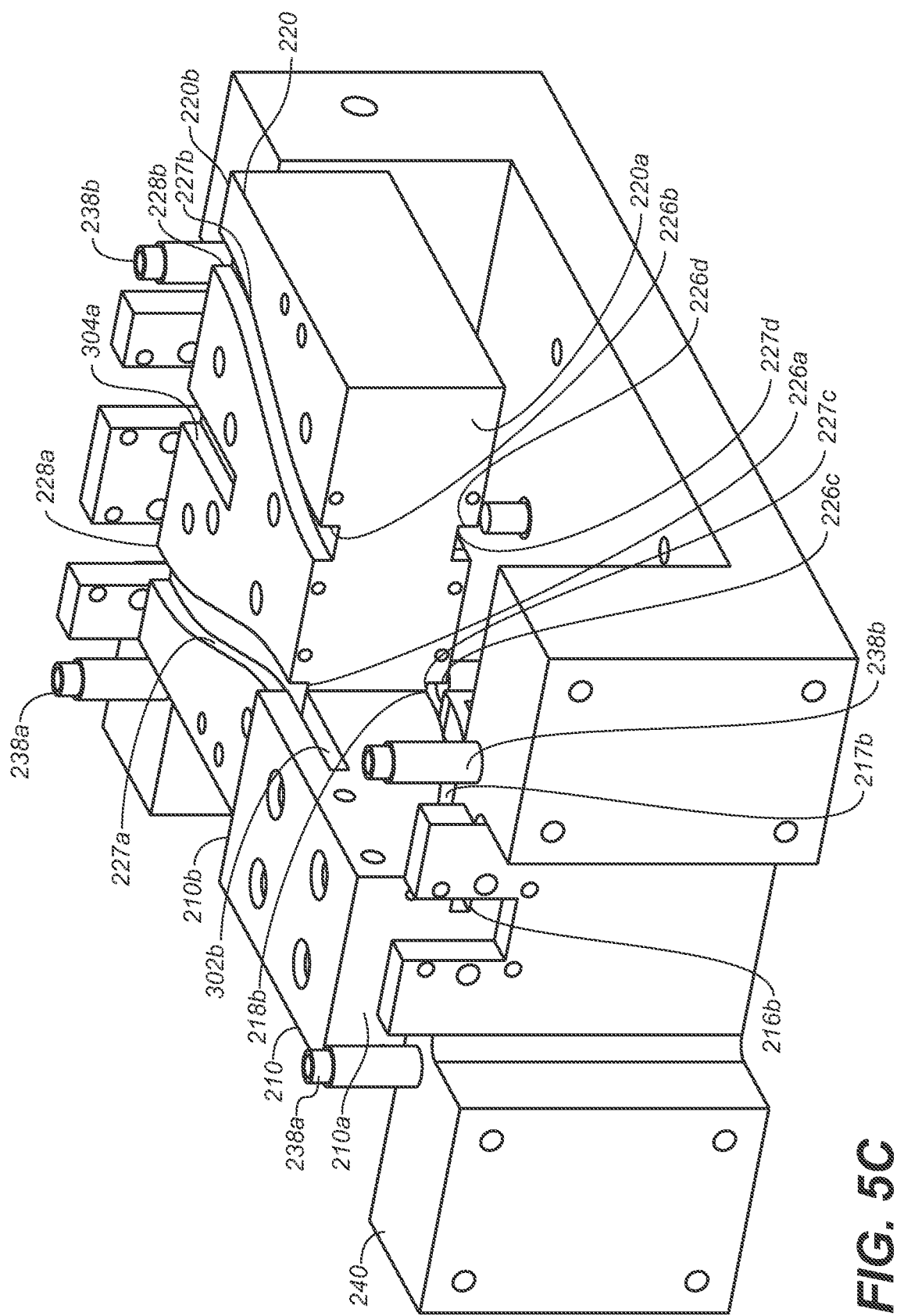

In FIG. 5C, lower channel 217b in the first transfer block 210 is aligned to lower input channel 227c in the second transfer block 220 via output opening 218b (in first transfer block 210) and input opening 226c (in second transfer block 220). In FIG. 5C, first transfer block 210 has moved laterally and linearly (to the left) to align input opening 216b to the input waveguide 214 (not shown in the Figure). Second transfer block 220 has moved laterally and linearly (to the right) to align output opening 218b and input opening 226c.

Figure 5D:
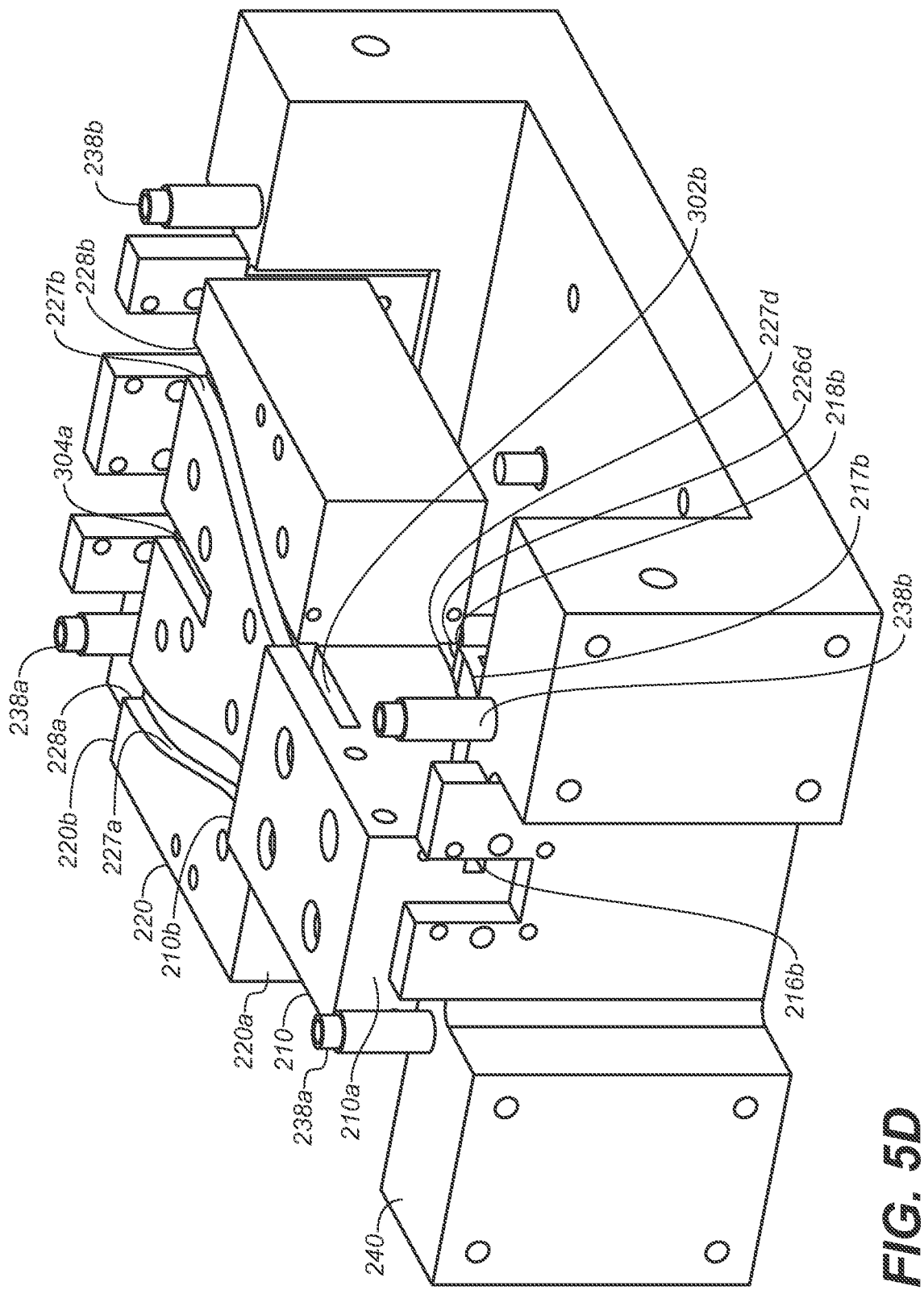

In FIG. 5D, lower channel 217b in the first transfer block 210 is aligned to lower input channel 227d in the second transfer block 220 via output opening 218b (in first transfer block 210) and input opening 226d (in second transfer block 220). In FIG. 5D, first transfer block 210 has remained stationary and second transfer block has moved laterally and linearly (to the left) to align output opening 218b and input opening 226d.

To return to the configuration shown in FIG. 5A from the one shown in FIG. 5D, the first transfer block 210 is moved laterally and linearly to the right, and the second transfer block 220 is also moved laterally and linearly to the right. This movement aligns input opening 216a with the input waveguide 214 and aligns output opening 218a (in first transfer block 210) with input opening 226a (in second transfer block 220).

Table I below summarizes the alignment of one of the output openings 218a, 218b of the first transfer block 210 with one of the input openings 226a, 226b, 226c, 226d of the second transfer block 220, as depicted in FIGS. 5A-5D. Also shown in Table I is the corresponding alignment of the channels.

TABLE I

| FIG. | OUTPUT OPENING | INPUT OPENING | ALIGNS CHANNELS |
|---|---|---|---|
| 5A | 218a | 226a | 217a to 227a |
| 5B | 218a | 226b | 217a to 227b |
| 5C | 218b | 226c | 217b to 227c |
| 5D | 218b | 226d | 217b to 227d |

It will be appreciated that the input openings 216a-216b and 226a-226d, channels 217a-217b and 227a-227d, and output openings 218a-218b and 228a-228d are configured to transmit millimeter waves and may conveniently be essentially the same dimensions as the input waveguide 214 and output waveguides 224a-224d.

Figure 6:
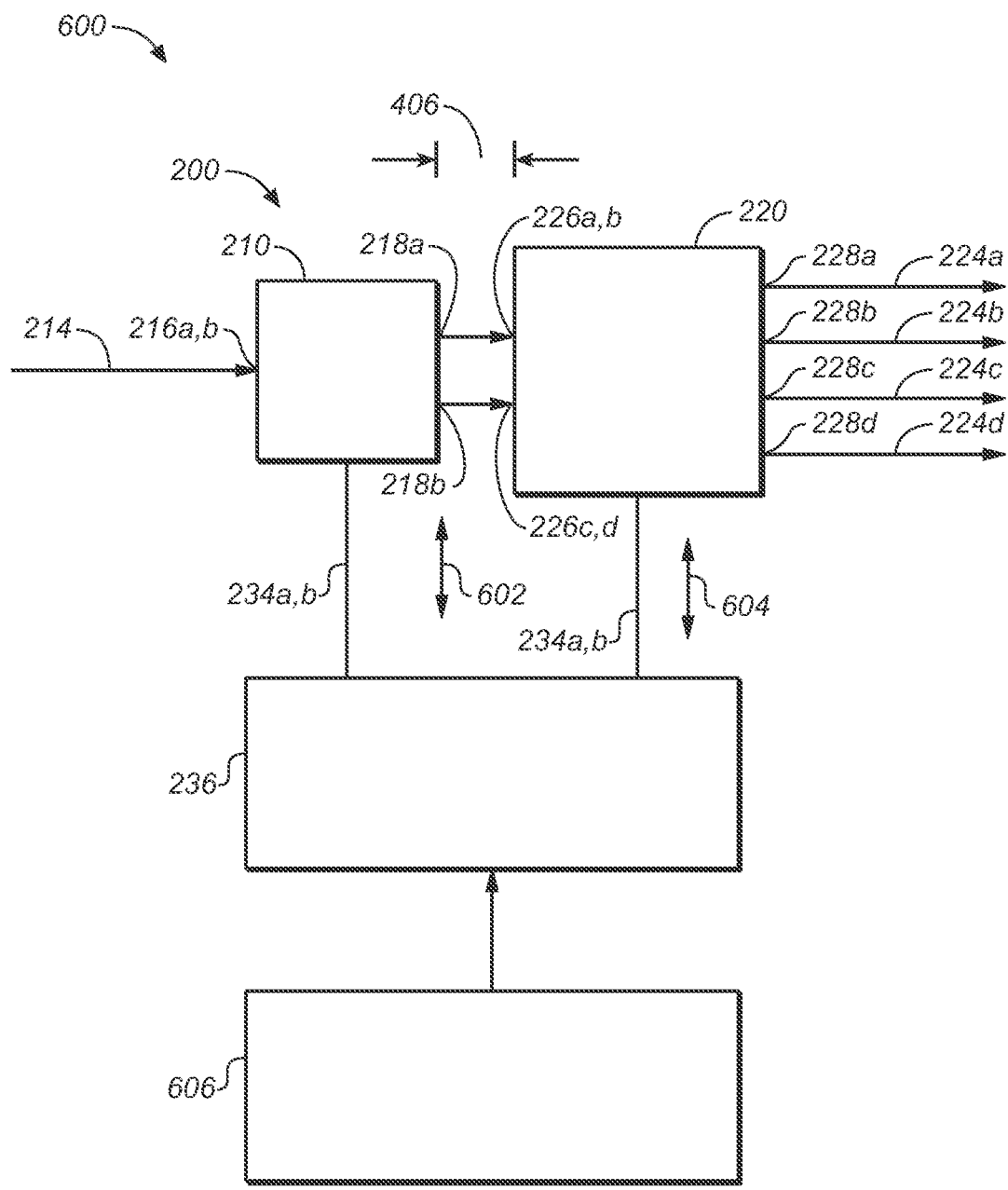
FIG. 6 is a block diagram, depicting computer-controlled operation of the reciprocating millimeter waveguide switch, according to an embodiment.

FIG. 6 is a block diagram 600 that depicts control of the reciprocal movement of the two transfer blocks 210 and 220, using actuators 236. The use of solenoids (uni-directional or bi-directional) as the actuators 236 is described above.

The actuator 236 associated with the first transfer block 210 moves the block 210 in a reciprocal motion back-and-forth, as shown by the double-headed arrow 602, while the actuator 236 associated with the second transfer block 220 moves the block 220 in a reciprocal motion back-and-forth, as shown by the double-headed arrow 604. The gap 406 is maintained during the movements of the two transfer blocks 210, 220.

Depending on the positions of the two transfer blocks 210, 220, as described above with reference to FIGS. 5A-5D, a signal on waveguide 214 may be transferred either from output opening 218a to input opening 226a or 226b or from output opening 218b to input opening 226c or 226d. In this way, a signal on waveguide 214 is switched to one of four output waveguides 224a-224d.

The actuators 236 may be controlled by a computer 606, either by direct input by an operator or by an algorithm or other set of instructions on the computer. The computer 606 may receive input from sensors (not shown) in the reciprocating millimeter waveguide switch 200. Other aspects of computer control of the actuators 236 by the computer 606 will be apparent to those skilled in this art. For example, computer 606 operates to select a position of each actuator 236, thus routing the signal. Computer 606 can also control the rate of change from input openings to output openings.

Figure 7:
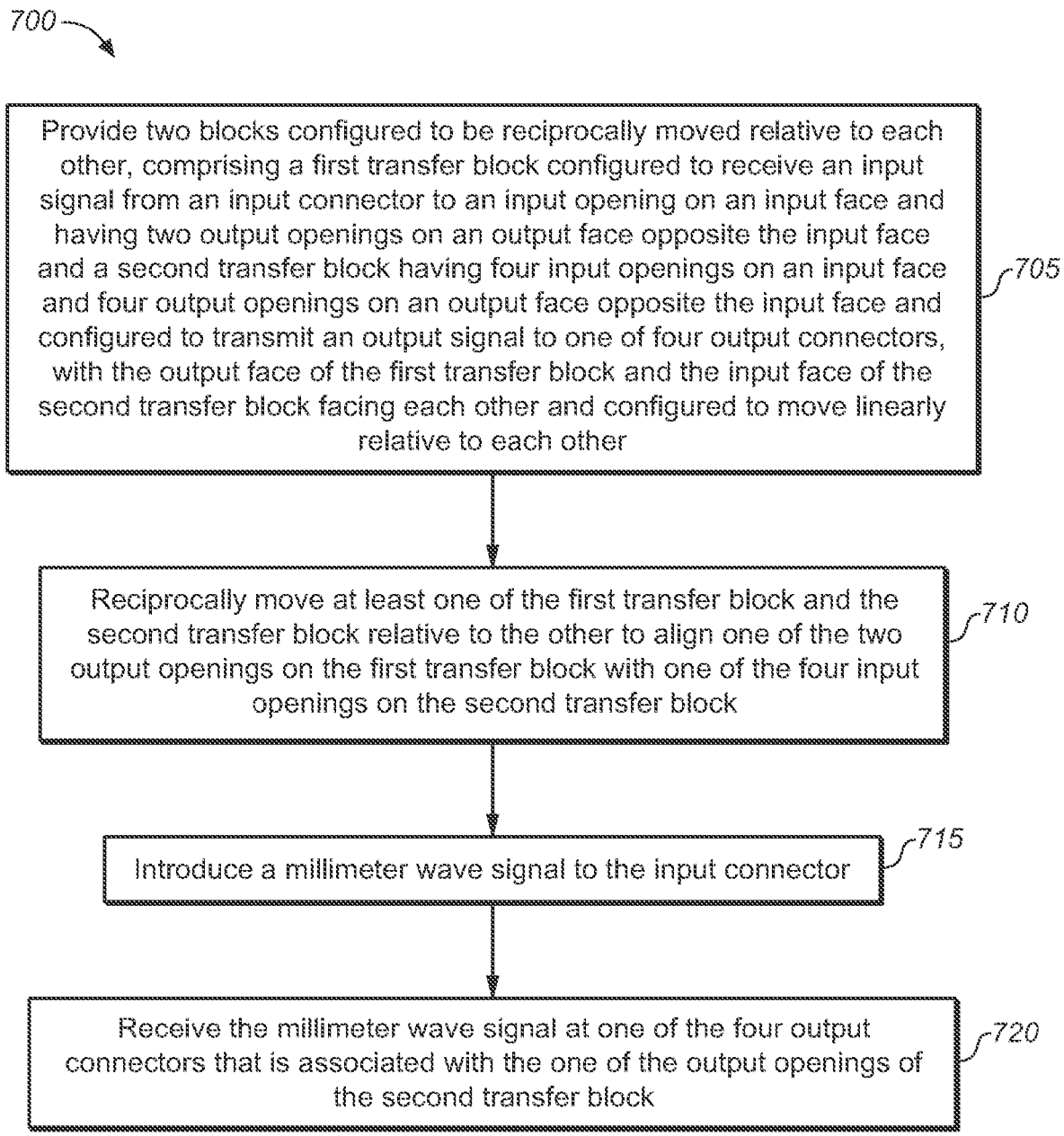
FIG. 7 is a flow chart, depicting a method for switching millimeter waves from one input to one of four outputs, according to an embodiment.

In an embodiment, a method for switching millimeter waves from one input to one of four outputs is provided. FIG. 7 depicts the switching method 700. The method 700 includes providing 705 two blocks configured to be reciprocally moved relative to each other, comprising the first transfer block 210 and the second transfer block 220. The first transfer block 210 is configured to receive an input signal from the input waveguide 214 to the input opening 216a, 216b on the input face 210a. The first transfer block 210 has two output openings 218a, 218b on the output face 210b opposite the input face 210a. The second transfer block 220 has four input openings 226a-226d on the input face 220a and four output openings 228a-228d on the output face 220b opposite the input face. The second transfer block 220 is configured to transmit an output signal to one of four output waveguides 224a-224d. The output face 210b of the first transfer block 210 and the input face 220a of the second transfer block 220 face each other and are configured to move linearly relative to each other.

The method 700 additionally includes reciprocally moving 710 at least one of the first transfer block 210 and the second transfer block 220 relative to the other to align one of the two output openings 218a, 218b in the first transfer block with one of the four input openings 226a-226d on the second transfer block.

The method 700 further includes introducing 715 a millimeter wave signal to the input connector 212.

The method 700 concludes with receiving 720 the millimeter wave signal at one of the four output connectors 222a-222d that is respectively associated with the output opening 228a-228d of the second transfer block 220.

In some embodiments, reciprocally moving 710 involves moving the blocks reciprocally relative to each other. During the movement and due to the linear motion between the two blocks, the blocks are separated by the gap 406 that remains substantially constant through a range of block movement. In an embodiment, the gap 406 has a spacing of greater than 0 to about 0.06 millimeters.

The teachings herein, which have been directed to depicting the construction and operation of a 1×4 reciprocating millimeter waveguide switch, may be extended to other M×N switches. For example, a 1×6 switch may be formed by providing a third channel straight through the first transfer block 210 that starts between the input openings 216a and 216b and terminates in an output opening between the two output openings 218a and 218b. Two corresponding channels may be provided straight through the second transfer block 220 that begin between the two upper input openings 226a, 226b and the two lower output openings 226c, 226d. The transfer blocks 210, 220 may be provided with three stops so as to allow alignment of a selected output opening in the first transfer block 210 with a selected input opening in the second transfer block 220. In another embodiment, the computer 606 may control the extent of the travel of the two transfer blocks 210, 220 through the actuators 236. Based on these teachings, the value of N may be increased, say to 8 or 16, for example.

For multiple input waveguides (M>1), additional input waveguides, similar to input waveguide 214, may be provided, with a shutter mechanism configured to allow one input beam through and block others. The shutter mechanism could be controlled by the computer 606. Again, the reciprocal sliding mechanism for linearly moving the transfer blocks 210, 220 back-and-forth may be employed.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A mechanical, one-to-four, reciprocating millimeter waveguide switch, comprising:
    a first transfer block having an input connector configured to convey millimeter waves, wherein the first transfer block has an input face and an output face, with the output face opposite the input face and the input connector disposed on the input face, wherein the reciprocating millimeter waveguide switch has one input connector to the first transfer block, and wherein the first transfer block passes millimeter waves from the input connector to input openings on the input face, with one input split into two input channels that each terminate at one output opening of a plurality of output openings on the output face of the first transfer block; and
    a second transfer block having output connectors configured to convey millimeter waves, wherein the second transfer block has an output face and an input face, with the input face opposite the output face and the output connectors disposed on the output face, wherein the reciprocating millimeter waveguide switch has four output connectors from the second transfer block, wherein the second transfer block passes millimeter waves from four input openings on the input face of the second transfer block to the four output connectors on the output face of the second transfer block, the four output connectors each operatively connected to a separate channel to form four output channels, each output channel terminating at one of the input openings on the input face of the second transfer block, such that switching occurs by matching one input opening of the second transfer block with one output opening of the first transfer block;
    wherein each block is configured to move linearly reciprocally relative to the other, wherein the output face of the first transfer block and the input face of the second transfer block are configured to reciprocally move in non-touching contact relative to each other.

2. The reciprocating millimeter waveguide switch of claim 1, wherein:
    the two input channels in the first transfer block comprise:
        a first channel connected to the input connector on the input face of the first transfer block that is downwardly curved and connected to one of the output openings; and
        a second channel connected to the input connector that is upwardly curved and connected to another of the output openings; and
    the four output channels in the second transfer block comprise:
        two upper channels through an upper portion of the second transfer block and separated from each other, each terminating in one of the output openings, and two lower channels through a lower portion of the second transfer block and separated from each other, each terminating in others of the output openings;
wherein the first transfer block and second transfer block are configured such that the upwardly curved channel of the first transfer block can align through respective input and output openings with either of the two upper channels of the second transfer block in one of two positions and the downwardly curved channel of the first transfer block can align through respective input and output openings with either of the two lower channels of the second transfer block in one of two positions.

3. The reciprocating millimeter waveguide switch of claim 1, wherein each input opening and each output opening comprises a choke flange so as to provide an air gap upon mating of a particular input opening with a particular output opening.

4. The reciprocating millimeter waveguide switch of claim 1, wherein the output face of the first transfer block and the input face of the second transfer block are separated by a gap having a spacing within a range of greater than 0 inch to about 0.10 inch and wherein the gap is substantially constant during linear movement of the two blocks relative to each other.

5. A mechanical, one-to-four, reciprocating millimeter waveguide switch comprising:
 a first transfer block having one input and a second transfer block having four outputs, each block configured to be linearly moved relative to the other;
 the first transfer block having an input connector on an input face of the first transfer block connected to two input channels that terminate in output openings on an output face of the first transfer block opposite the input face;
 the second transfer block having four output channels that originate from input openings on an input face of the second transfer block and are each connected to output connectors on an output face of the second transfer block; and
 the blocks being configured to slide relative to each other so that the output face of the first transfer block faces the input face of the second transfer block and switching occurs by matching one input channel with one output channel, wherein each block is mounted on a rail of a rail set comprising two parallel rails and wherein each block is configured to be moved laterally by a pair of arms actuated by an actuator, and wherein each block includes bearings to move on the rail set.

6. The reciprocating millimeter waveguide switch of claim 5, wherein:
 the first transfer block has a first channel connected to the input connector on the input face of the first transfer block that is downwardly curved and connected to one of the input openings and a second channel connected to the input connector that is upwardly curved and connected to another of the input openings; and
 the second transfer block has four waveguide channels, two waveguide channels through an upper portion of the second transfer block and separated from each other, each terminating in one of the output openings, and two waveguide channels through a lower portion of the second transfer block and separated from each other, each terminating in one of the output openings,
 wherein the first transfer block and second transfer block are configured such that the upwardly curved channel of the first transfer block can align through respective input and output openings with either of the upper channels of the second transfer block in one of two positions and the downwardly curved channel of the first transfer block can align through respective input and output openings with either of the lower channels of the second transfer block in one of two positions.

7. The reciprocating millimeter waveguide switch of claim 5, wherein each input opening in the first transfer block comprises a choke flange and wherein each output opening in the second transfer block comprises a choke flange so as to provide a gap upon mating of a particular input opening with a particular output opening.

8. The reciprocating millimeter waveguide switch of claim 7, wherein the gap has a spacing within a range of greater than 0 inch to about 0.06 inch and wherein the gap is substantially constant during linear movement of the first transfer block and the second transfer block relative to each other.

9. The reciprocating millimeter waveguide switch of claim 5, wherein the actuator is either a pair of uni-directional solenoids or a bi-directional solenoid.

10. A method for switching millimeter waves from one input to one of four outputs, comprising:
 providing two blocks configured to be reciprocally moved relative to each other, the two blocks comprising a first transfer block configured to receive an input signal from an input connector to an input opening on an input face and having two output openings on an output face opposite the input face and a second transfer block having four input openings on an input face and four output openings on an output face opposite the input face and configured to transmit an output signal to one of four output connectors, with the output face of the first transfer block and the input face of the second transfer block facing each other and configured to move linearly relative to each other, wherein each block of the two blocks is mounted on a rail of a rail set comprising two parallel rails and wherein each block is configured to be moved laterally by a pair of arms actuated by an actuator, and wherein each block includes bearings to move on the rail set;
 reciprocally moving at least one of the first transfer block and the second transfer block relative to the other along at least one rail of the rail set to align one of the two output openings on the first transfer block with one of the four input openings on the second transfer block;
 introducing a millimeter wave signal to the input connector; and
 receiving the millimeter wave signal at one of the four output connectors that is associated with one of the output openings of the second transfer block.

11. The method of claim 10, wherein each input opening is connected to a respective output opening by a channel.

12. The method of claim 10, wherein during moving the first transfer block and the second transfer block relative to the other, the blocks are separated by a gap that remains substantially constant through a range of block movement.

13. The method of claim 10, wherein each input opening and each output opening comprises a choke connection.

* * * * *